United States Patent
Loh et al.

(10) Patent No.: US 12,492,629 B2
(45) Date of Patent: Dec. 9, 2025

(54) DOWNHOLE RESISTIVE MEMBRANE POTENTIOMETER FOR WELL SYSTEMS

(71) Applicant: Halliburton Energy Services, Inc., Houston, TX (US)

(72) Inventors: Kar Ki Andrew Loh, Singapore (SG); How Jiun Irvin Yuen, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 8 days.

(21) Appl. No.: 18/403,105

(22) Filed: Jan. 3, 2024

(65) Prior Publication Data

US 2025/0215785 A1 Jul. 3, 2025

(51) Int. Cl.
*E21B 47/09* (2012.01)
*E21B 47/06* (2012.01)
*G01L 9/00* (2006.01)

(52) U.S. Cl.
CPC .............. *E21B 47/06* (2013.01); *E21B 47/09* (2013.01); *G01L 9/0027* (2013.01)

(58) Field of Classification Search
CPC ................................. E21B 47/06; E21B 47/09
USPC ....................................................... 166/250.01
See application file for complete search history.

(56) References Cited

U.S. PATENT DOCUMENTS

| | | | |
|---|---|---|---|
| 3,964,556 A * | 6/1976 | Gearhart | E21B 47/0236 175/45 |
| 4,333,068 A * | 6/1982 | Kishel | H01C 10/08 338/202 |
| 4,649,344 A * | 3/1987 | Moll | E21B 47/022 324/202 |
| 4,975,676 A | 12/1990 | Greenhalgh | |
| 8,138,860 B2 * | 3/2012 | Marriott | H01C 10/14 335/78 |
| 2001/0016396 A1 * | 8/2001 | Lee | H10D 1/474 257/E27.047 |
| 2008/0164970 A1 | 7/2008 | Malzahn | |

FOREIGN PATENT DOCUMENTS

| | | | | |
|---|---|---|---|---|
| CN | 208091606 | * | 11/2018 | ............... G01L 1/22 |
| JP | 2015230202 | | 12/2015 | |

OTHER PUBLICATIONS

"PCT Application No. PCT/US2024/010226 International Search Report and Written Opinion", Sep. 30, 2024, 11 pages.

* cited by examiner

*Primary Examiner* — William D Hutton, Jr.
*Assistant Examiner* — Ashish K Varma
(74) *Attorney, Agent, or Firm* — DeLizio, Peacock, Lewin & Guerra LLP

(57) ABSTRACT

Systems, methods, and apparatus including a downhole membrane potentiometer that may be used in well systems. The downhole membrane potentiometer may include a first circuit film having a resistance trace, a second circuit film having a collector trace, and an insulator spacer coupled between the first circuit film and the second circuit film. The insulator spacer may include one or more pressure vent holes in a first side of the insulator spacer and one or more pressure vent holes in a second side of the insulator spacer to minimize a differential pressure between the inside and outside of the downhole membrane potentiometer.

16 Claims, 8 Drawing Sheets

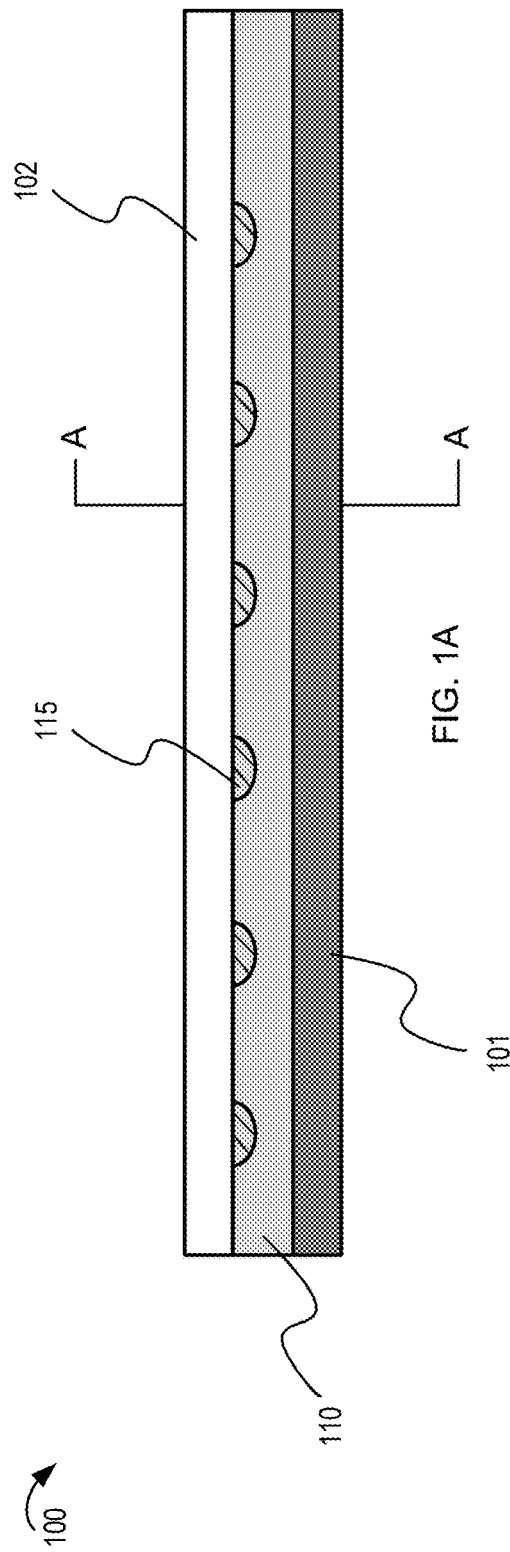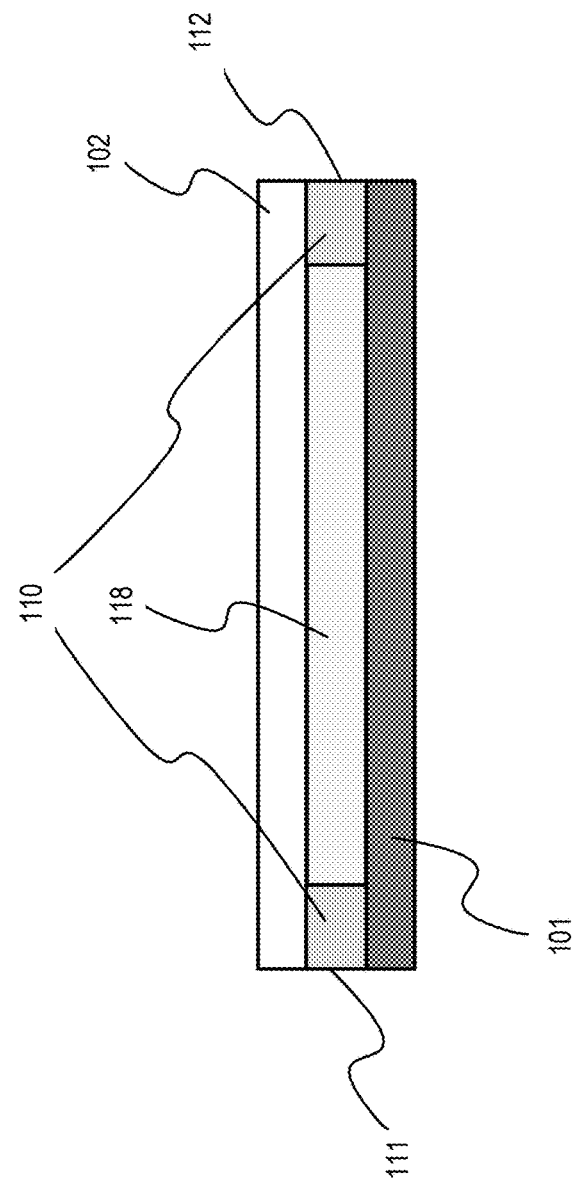
FIG. 1A
FIG. 1B

DOWNHOLE RESISTIVE MEMBRANE POTENTIOMETER FOR WELL SYSTEMS

TECHNICAL FIELD

The present invention relates generally to oil and gas systems and services, and more specifically to a downhole resistive membrane potentiometer for well systems.

BACKGROUND

The oil and gas services industry uses various types of downhole well devices or tools having potentiometers in well systems. A typical linear or angular potentiometer includes resistance wires and a sliding or movable contact (which may be referred to as a slider or wiper). The angular potentiometer may be arranged in a circular form inside the packaging of the assembled product, and the linear potentiometer may be arranged in a straight or horizontal line inside the packaging of the assembled product. The resistance wires may be wound such that the slider or wiper makes contact with the resistance wires at different positions when the slider or wiper is moved in various directions, either circular or linear. A linear or angular potentiometer may be a passive transducer because it needs an external power source for its operation. When the slider or wiper moves or slides axially or radially along the various turn of the resistance wires, the effective resistance between one end of the wire and the slider changes. Hence, an output change of the voltage can be measured. This output voltage generated may be an angular or linear function of the displacement or angular position to be measured. However, this type of potentiometer included in an assembled product for a well system is typically significant in size. The assembled parts that form the potentiometer for a well system application typically include a mandrel, a slider or wiper, and multiple turns of resistance wires coiled along the mandrel and these components are typically assembled within a housing.

BRIEF DESCRIPTION OF THE DRAWINGS

FIG. 1A depicts a conceptual diagrams of an example downhole resistive membrane potentiometer for well systems, according to some implementations.

FIG. 1B depicts a conceptual diagrams of a cross-sectional view of the example downhole resistive membrane potentiometer shown in FIG. 1A, according to some implementations.

DESCRIPTION

Figure 2:
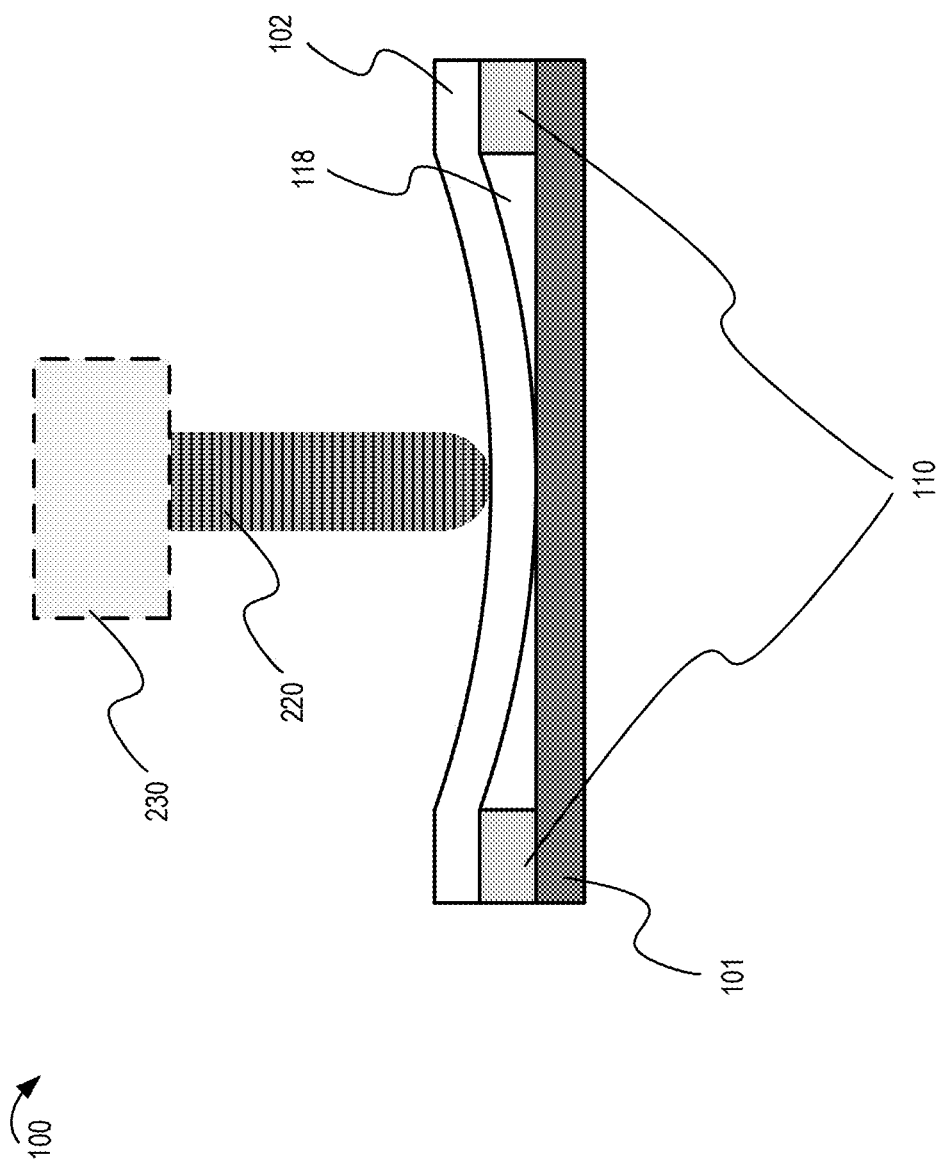
FIG. 2 depicts a conceptual diagram showing an example contact pressure component for taking measurements using the downhole resistive membrane potentiometer, according to some implementations.

The description that follows includes example systems, methods, techniques, and program flows that describe aspects of the disclosure. However, it is understood that this disclosure may be practiced without these specific details. For instance, this disclosure refers to certain well devices or tools in illustrative examples. Aspects of this disclosure can be instead applied to other types of well devices and tools. In other instances, well-known instruction instances, protocols, structures, and techniques have not been shown in detail to avoid confusion.

FIGS. 1A and 1B depict conceptual diagrams of an example downhole resistive membrane potentiometer 100 for well systems, according to some implementations. FIG. 1A depicts a side view of the downhole resistive membrane potentiometer 100. FIG. 1B depicts a cross-sectional view of the downhole resistive membrane potentiometer 100. As shown in FIG. 1A, the downhole resistive membrane potentiometer 100 may include a first circuit film 101 having a resistance trace, a second circuit film 102 having a collector trace, and an insulator spacer 110. The insulator spacer 110 may include pressure vent holes 115. In some implementations, the first circuit film 101 having the resistance trace and the second circuit film 102 having the collector trace may be printed or fabricated on a thin membrane or film using wafer integrated circuit (IC) fabrication techniques. Using thin membranes or films for the downhole resistive membrane potentiometer 100 may significantly reduce the size of the potentiometer, and may allow the placement of the potentiometer in various positions within a downhole well tool or other device of the well system without compromising tool or device space. The insulator spacer 110 may include one or more pressure vent holes 115 for downhole pressure regulation. In some implementations, the insulator spacer 110 may include one or more pressure vent holes 115 in a first side of the insulator spacer 110, and one or more pressure vent holes 115 in a second side of the insulator spacer 110 to minimize a differential pressure, as further described below. For example, the insulator spacer 110 may include five to fifteen pressure vent holes 115 on a first side of the insulator spacer 110, and five to fifteen pressure vent holes 115 on a second side of the insulator spacer 110. It is noted, however, that the insulator spacer 110 may include any number of pressure vent holes 115 in any number of sides of the insulator spacer to regulate the downhole pressure. As described further herein, in some implementations, the downhole resistive membrane potentiometer 100 may be used as an angular or linear position sensor in high temperature and high pressure downhole environments of well systems.

As shown in FIG. 1A, in some implementations, the insulator spacer 110 may be positioned or placed between the first circuit film 101 having the resistance trace and the second circuit film 102 having the collector trace in order to isolate the two circuit films and traces, unless a contact pressure is applied, as further described in FIG. 2. FIG. 1A shows the resistance trace as the top layer (i.e., the top circuit film), and the collector trace as the bottom layer (i.e., the bottom circuit film). It is noted, however, that in some implementations, the resistance trace can be either the top or the bottom layer, and the collector trace can be the other layer or the layer at the opposite side (i.e., the collector trace can also be either the top or the bottom layer).

The downhole resistive membrane potentiometer 100 may be designed and configured to withstand high temperatures and high pressures, such as the high temperatures and pressures in a downhole well environment. In some implementations, the thin membranes, films, and/or circuit materials may be made of a high temperature and pressure resistant material, such as a polyimide material. It is noted, however, that the thin membranes, films, and/or circuit materials may be made of other types of high temperature and pressure resistant materials. In some implementations, the downhole resistive membrane potentiometer 100 may include multiple pressure vent holes 115 on two sides of the insulator spacer 110 to regulate and minimize the downhole pressure (e.g., the differential pressure) felt by the downhole resistive membrane potentiometer 100, as further described below. It is noted, however, that in some implementations, the pressure vent holes 115 may be located in only one side of the insulator spacer 110 or in three or more sides of the insulator spacer 110. FIG. 1A shows one of the sides of the insulator spacer 110 and of the downhole resistive membrane potentiometer 100. The other or opposing side of the insulator spacer 110 may similarly have multiple pressure vent holes 115.

FIG. 1B, which shows a cross-section of the downhole resistive membrane potentiometer 100, e.g., at section A-A of the diagram of FIG. 1A. As shown in FIG. 1B, the insulator spacer 110 may include a first side 111 and a second side 112, and may also include a gap (or an empty area or section) in between the first side 111 and the second side 112. In some implementations, the gap in between the first side 111 and the second side 112 of the insulator spacer 110 may form or create an internal cavity 118 in between the first circuit film 101 having the resistance trace and the second circuit film 102 having the collector trace. In some implementations, the internal cavity 118 of the downhole resistive membrane potentiometer 100 may be filled with a non-conductive liquid that can exit and enter the internal cavity 118 via the pressure vent holes 115 in order to regulate and minimize the downhole pressure. For example, the pressure vent holes 115 may allow the non-conductive liquid to exit or enter the internal cavity 118 to achieve a balanced pressure and minimize the differential pressure. If the downhole resistive membrane potentiometer 100 had an internal cavity 118 without having the pressure vent holes 115 in the insulator spacer 110, the downhole resistive membrane potentiometer 100 may collapse from the differential pressure felt in high pressure downhole environments.

In some implementations, the pressure vent holes 115 may each be a predetermined size or a controlled size that has been tested to allow the non-conductive liquid to exit and enter the internal cavity 118 to achieve a pressure balance and minimize the differential pressure. It is noted that in some implementations the pressure vent holes 115 can be any size that allows the non-conductive liquid to exit and enter the internal cavity 118 to achieve a pressure balance, and the insulator spacer 110 can include any number of pressure vent holes 115. The non-conductive liquid be any non-conductive liquid, such as a hydraulic oil or a silicone oil. In some implementations, the pressure vent holes 115 may allow the non-conductive liquid (e.g., such as a hydraulic oil) to fill the internal cavity 118 forming a pressure balance throughout the downhole resistive membrane potentiometer 100. The pressure vent holes 115 may ensure the internal non-conductive liquid (e.g., such as the hydraulic oil) is pushed out without causing any pressure differential (or minimizing the pressure differential) between the internal cavity 118 and the external environment. By incorporating the pressure vent holes 115 that can achieve a pressure balance and minimize the differential pressure, the downhole resistive membrane potentiometer 100 can be concealed and pre-filled with the non-conductive liquid in the internal cavity 118.

FIG. 2 depicts a conceptual diagram showing an example contact pressure component 220 for taking measurements using the downhole resistive membrane potentiometer 100, according to some implementations. The contact pressure component 220 may be a round tip component, a ball plunger, or a screw (e.g., such as a set screw), among others. In some implementations, the contact pressure component 220 (e.g., such as the round tip component) may press down and flex the second circuit film 102 having the collector trace, and this results in the second circuit film 102 contacting the first circuit film 101 having the resistance trace. When the second circuit film 102 is pressed down by the contact pressure component 220 and contacts the first circuit film 101, a closed circuit is formed and a fixed input voltage is applied on the first circuit film 101 having the resistance trace. The contact pressure component 220 can contact the resistance trace at various different points on the resistance trace, which changes the effective resistance of the closed circuit. For example, as the contact pressure component 220 moves from a first point or position in the resistance trace to a second point or position in the resistance trace, the effective resistance in the closed circuit changes. When the resistance changes in the closed circuit, the voltage also changes and the output change in voltage from the first position to the second position can be measured. In some implementations, the measured voltage (or voltage change) can be used as a computation measurement to correlate to a linear or angular position measurement.

In some implementations, the second circuit film 102 may be made of a material that is thin enough to allow it to flex and make contact with the first circuit film 101. For example, both the first circuit film 101 and the second circuit film 102 may be made of polyimide film or other similar thin film or membrane material that is flexible and can withstand high temperatures and high pressures. As described in FIGS. 1A and 1B, the insulator spacer 110 includes one or more pressure vent holes that help balance the pressure and minimize the differential pressure between the internal cavity 118 and the external environment. Even when the contact pressure component is pressing down on the second circuit film 102 and the second circuit film 102 is making contact with the first circuit film 101, the pressure vent holes allow the non-conductive liquid (e.g., such as hydraulic oil) to exist and enter the internal cavity 118 to balance the pressure.

In some implementations, the contact pressure component 220 (e.g., such as a round tip or ball plunger or a set screw) can be attached to a component 230 of a well device or well tool that changes position to perform a function for the well tool or device. The resistance and/or voltage measurements taken by using the contact pressure component 220 with the circuit films of the downhole resistive membrane potentiometer 100 can sense or detect the angular or linear position change in the component 230 of the well device or tool by determining the angular or linear position measurement that correlate with the voltage and resistance measurements obtained using the contact pressure component 220. Thus, the contact pressure component 220 with the downhole resistive membrane potentiometer 100 can operate as an angular or linear position sensor. The component 230 of the well device or tool (which also may be referred to as functional component 230) may be various types of components that change position to perform a function for the well device or tool and for the well system. For example, the component 230 (or functional component 230) of a well tool or device may be an actuator or anchors or anchor slips of a well tool or device that engages or attaches the well tool or device to a casing of the well. In this example, as the anchor or anchor slip is extended to engage with the casing (or other surface) in the well, the movement or position change in the anchor or anchor slip can be measured using the voltage and/or resistance measurements obtained from the downhole resistive membrane potentiometer 100. This may help detect or sense when the anchors or anchor slips have moved a certain distance or moved from a first position to a second position that indicates that the anchors or anchor slips have engaged to the casing (or another surface) in the well. It is noted, however, that in other implementations the component 230 may be various types of functional components that perform various types of functions for the downhole well device or tool, such as various types of actuators.

In some implementations, the well device or tool may include multiple contact pressure components 220 and multiple corresponding downhole resistive membrane potentiometer 100. The multiple contact pressure components 220 and multiple corresponding downhole resistive membrane potentiometer 100 can be used to detect or sense the movements or position changes of multiple components 230. For example, the well device or tool may have two anchors or two anchor slips that have to monitored separately to determine if they have engaged with the casing. In this example, the well device or tool may have two contact pressure components 220 and two downhole resistive membrane potentiometers 100, i.e., a first contact pressure component 220 and a first downhole resistive membrane potentiometer 100 for a first anchor or a first anchor slip, and a second contact pressure component 220 and a second downhole resistive membrane potentiometer 100 for a second anchor or a second anchor slip.

Figure 3:
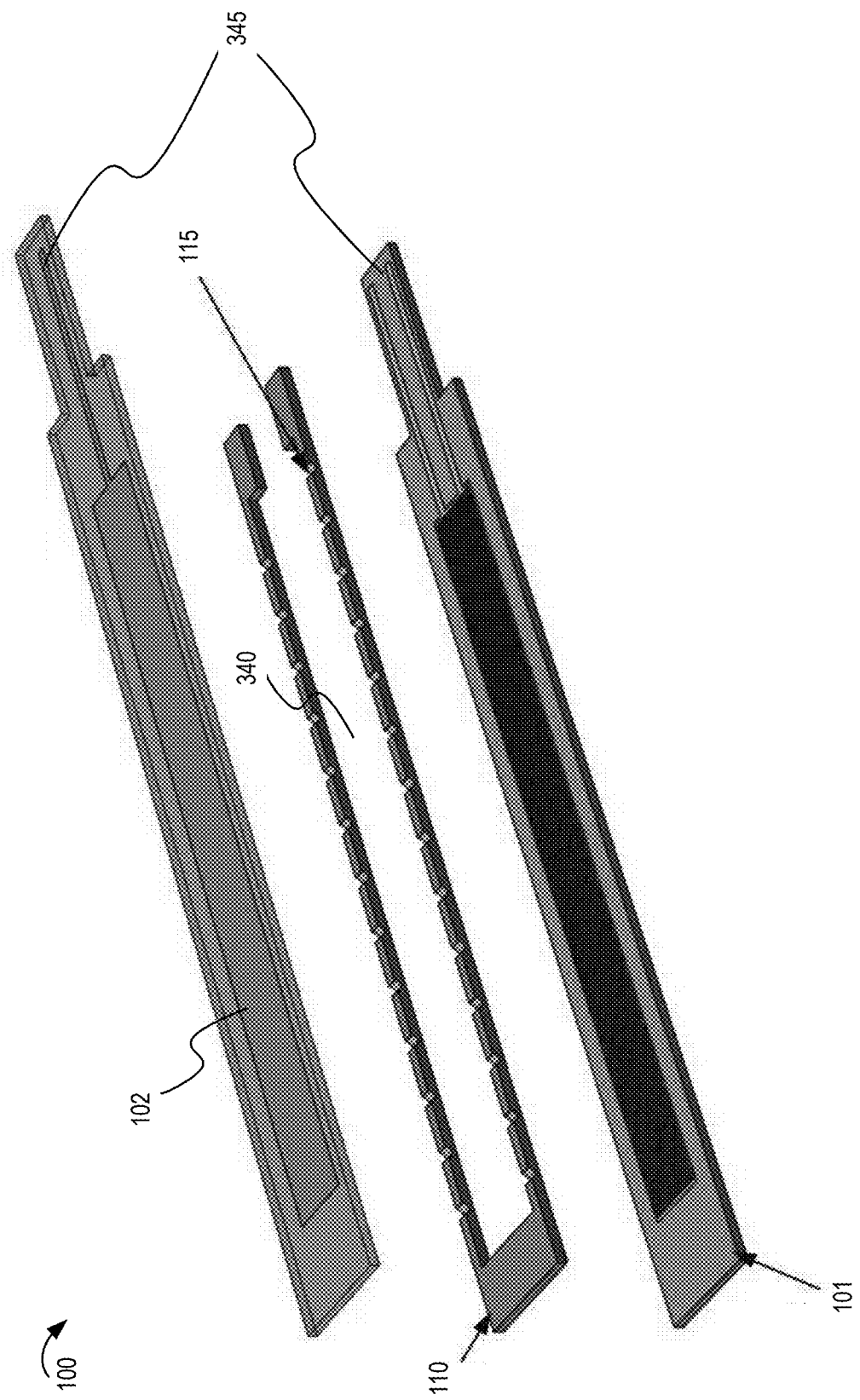
FIG. 3 depicts a schematic diagram showing an exploded view of an example downhole resistive membrane potentiometer, according to some implementations.

FIG. 3 depicts a schematic diagram showing an exploded view of an example downhole resistive membrane potentiometer 100, according to some implementations. As described in FIGS. 1A-1B, the downhole resistive membrane potentiometer 100 may include a first circuit film 101 having a resistance trace, a second circuit film 102 having a collector trace, and an insulator spacer 110. The insulator spacer 110 may include pressure vent holes 115. For example, the insulator spacer 110 may include multiple vent holes in a first side of the insulator spacer 110 and multiple vent holes in a second side of the insulator spacer 110. The insulator spacer 110 may also include a gap 340 in between the first and second sides of the insulator spacer 110, which creates an internal cavity (such as the internal cavity 118 shown in FIG. 1B) when the three layers (i.e., the first circuit film 101, the second circuit film 102, and the insulator spacer 110) are joined or bonded together. In some implementations, the first circuit film 101 is joined or bonded to the insulator spacer 110 and the insulator spacer 110 is joined or bonded to the second circuit film 102 using a high temperature epoxy.

Figure 4:
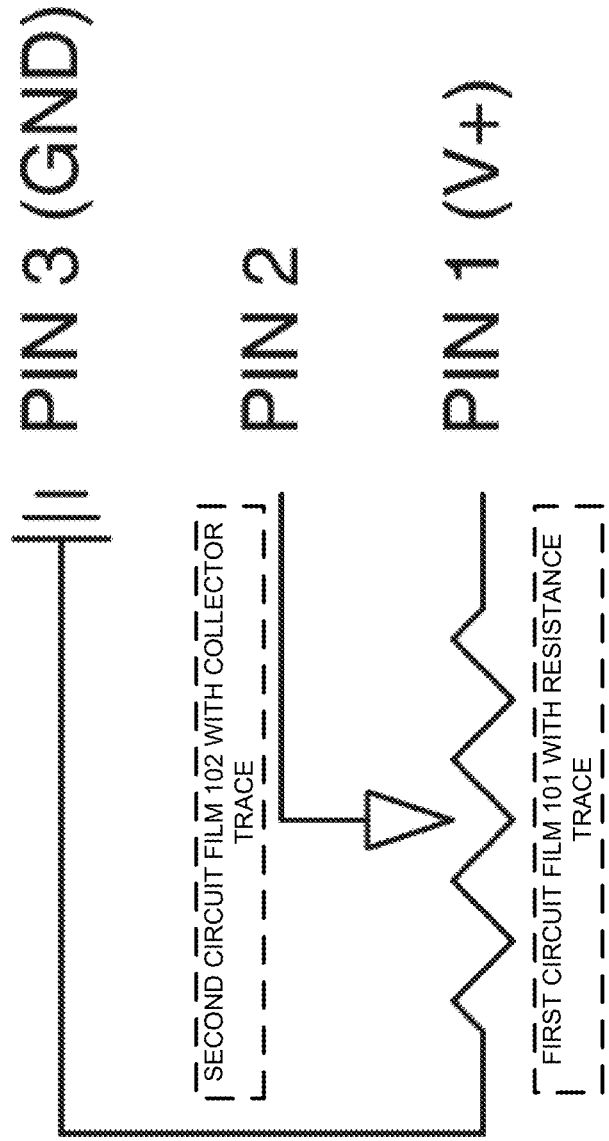
FIG. 4 depicts a schematic circuit diagram that is representative of the downhole resistive membrane potentiometer, according to some implementations.

In some implementations, the first circuit film 101 and the second circuit film 102 may be connected to a connector 345 (or a printed circuit board (PCB) trace), which allows a user or manufacturer or well operator to solder cables or wires to power and measure the voltage differential between the first circuit film 101 having the resistance trace and the second circuit film 102 having the collector trace when they are in contact (e.g., such as when the contact pressure component 220 shown in FIG. 2 causes the second circuit film 102 to make contact with the first circuit film 101). As shown in FIG. 3, a contact pressure component (such as the contact pressure component 220 of FIG. 2) can make contact with the second circuit film 102 at any point in the length of the second circuit film 102 having the collector trace, which results in the second circuit film 102 flexing and making contact with the corresponding point in the length of the first circuit film 101 having the resistance trace. The effective resistance may increase or decrease depending at what point in the length of the first circuit film 101 having the resistance trace the contact is made. FIG. 4 shows a schematic circuit diagram that can be representative of the closed circuit that is established when the second circuit film 102 comes into contact with the first circuit film 101, according to some implementations. The first circuit film 101 may be represented by a resistor with varying resistance. The second circuit film 102 in a flexed position and making contact with the first circuit film 101 may be represented by the arrow making contact with the resistor (e.g., such as when the contact pressure component 220 presses down on the second circuit film 102 as described in FIG. 2). A voltage may be provided on one side of the resistor and a ground may be provided on the other side of the resistor. For example, a power source may be connected to one of the sides of the resistor. In some implementations, the downhole resistive membrane potentiometer 100 may operate as a passive transducer because it may use an external power source for its operation. Depending on what point in the length of the resistor (or resistance trace of the first circuit film 101) the arrow (or the second circuit film 102 in a flexed position) comes in contact with the resistor, determines the effective resistance. When the effective resistance changes from the movement from making contact with a first position on the resistor trace to a second position in the resistance trace, an output change of the voltage can be measured. This output voltage or output change in voltage generated may be an angular or linear function of the displacement or angular position to be measured. As described previously, the resistance and/or voltage measurements can then be used to sense or detect position measurements or readings.

Figure 5A:
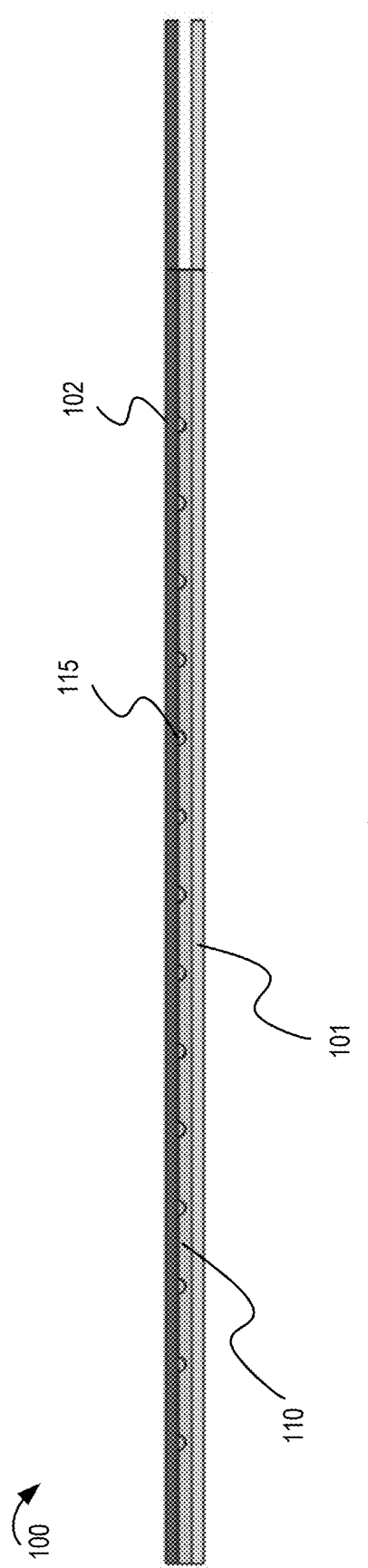
FIG. 5A depicts a schematic diagram showing a side or front view of an example downhole resistive membrane potentiometer, according to some implementations.
Figure 5B:
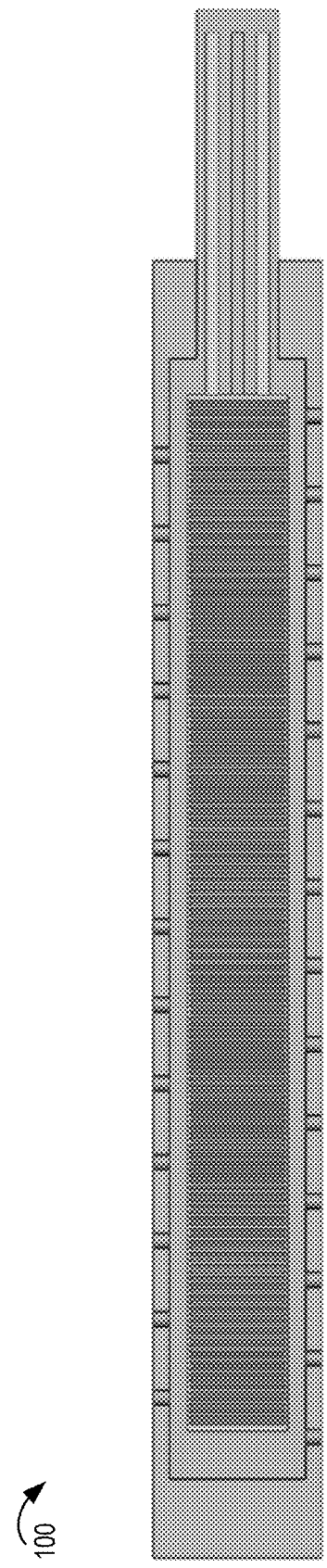
FIG. 5B depicts a schematic diagram showing a top or bottom view of an example downhole resistive membrane potentiometer, according to some implementations.

FIG. 5A depicts a schematic diagram showing a side or front view of an example downhole resistive membrane potentiometer 100, according to some implementations. As described in FIGS. 1A-1B, the downhole resistive membrane potentiometer 100 may include a first circuit film 101 having a resistance trace, a second circuit film 102 having a collector trace, and an insulator spacer 110. The insulator spacer 110 may include pressure vent holes 115. FIG. 5B depicts a schematic diagram showing a top or bottom view of an example downhole resistive membrane potentiometer 100, according to some implementations. FIG. 5B shows the first circuit film 101 bonded or joined with the insulator spacer 110 and the insulator spacer 110 bonded or joined with the second circuit film 102. FIGS. 5A and 5B also show the placement and position of multiple pressure vent holes 115, according to some implementations.

Figure 6:
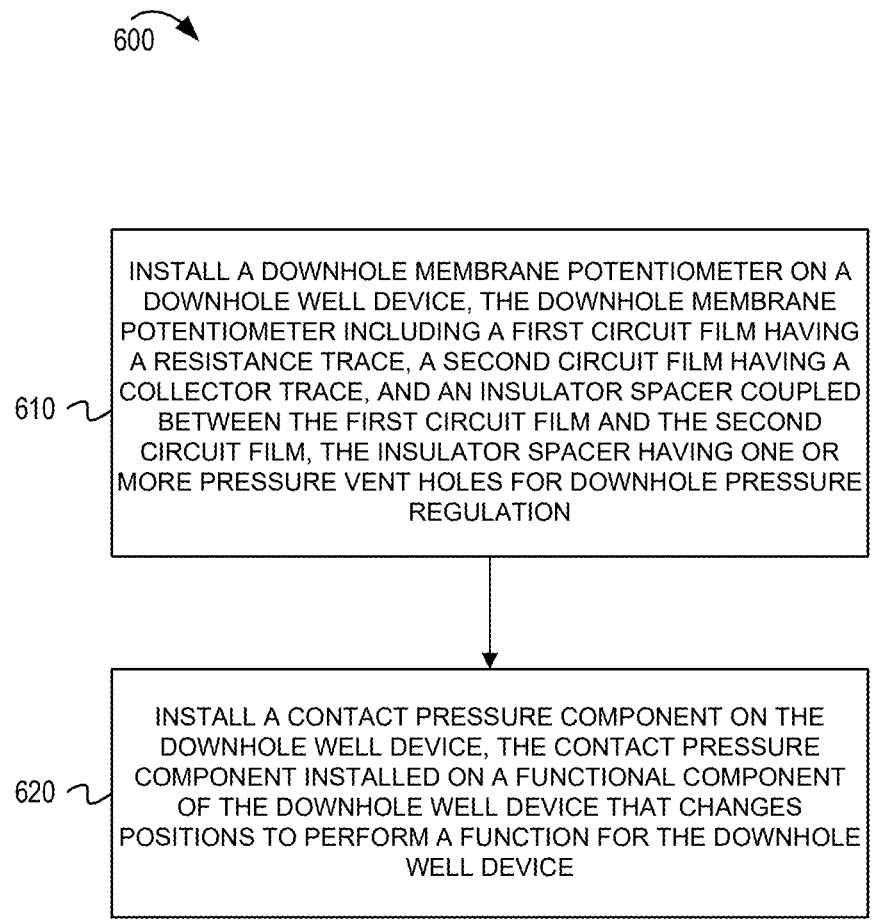
FIG. 6 is a flowchart of example operations for using a downhole resistive membrane potentiometer in a well system, according to some implementations.

FIG. 6 is a flowchart 600 of example operations for using a downhole resistive membrane potentiometer in a well system, according to some implementations. The operations may include installing a downhole membrane potentiometer on a downhole well device, the downhole membrane potentiometer including a first circuit film having a resistance trace, a second circuit film having a collector trace, and an insulator spacer coupled between the first circuit film and the second circuit film, the insulator spacer having one or more pressure vent holes for downhole pressure regulation (block 610). The operations may include installing a contact pressure component on the downhole well device, the contact pressure component installed on a functional component of the downhole well device that changes positions to perform a function for the downhole well device (block 620). In some implementations, the functional component may be an actuator, an anchor, or anchor slips and the function may be anchoring the downhole well device to a casing of the well. As described previously, it is noted that in other implementations the type of functional component may be one of various types of functional components that are used by downhole well devices, and the type of function may be one of various types of downhole functions that downhole well tools or devices perform in a well system.

In some implementations, when the position of the functional component of the downhole well device is changed from a first position to a second position when performing the function for the downhole well tool, the change in the position may cause the contact pressure component to press down on the second circuit film. The pressing down on the second circuit film may cause the collector trace of the second circuit film to make contact with the resistance trace of the first circuit film. In some implementations, angular or linear position measurements associated with the change in position of the functional component of the downhole well device may be derived or calculated based on voltage measurements obtained from the closed circuit, as was described previously with reference to FIG. 2.

Figure 7:
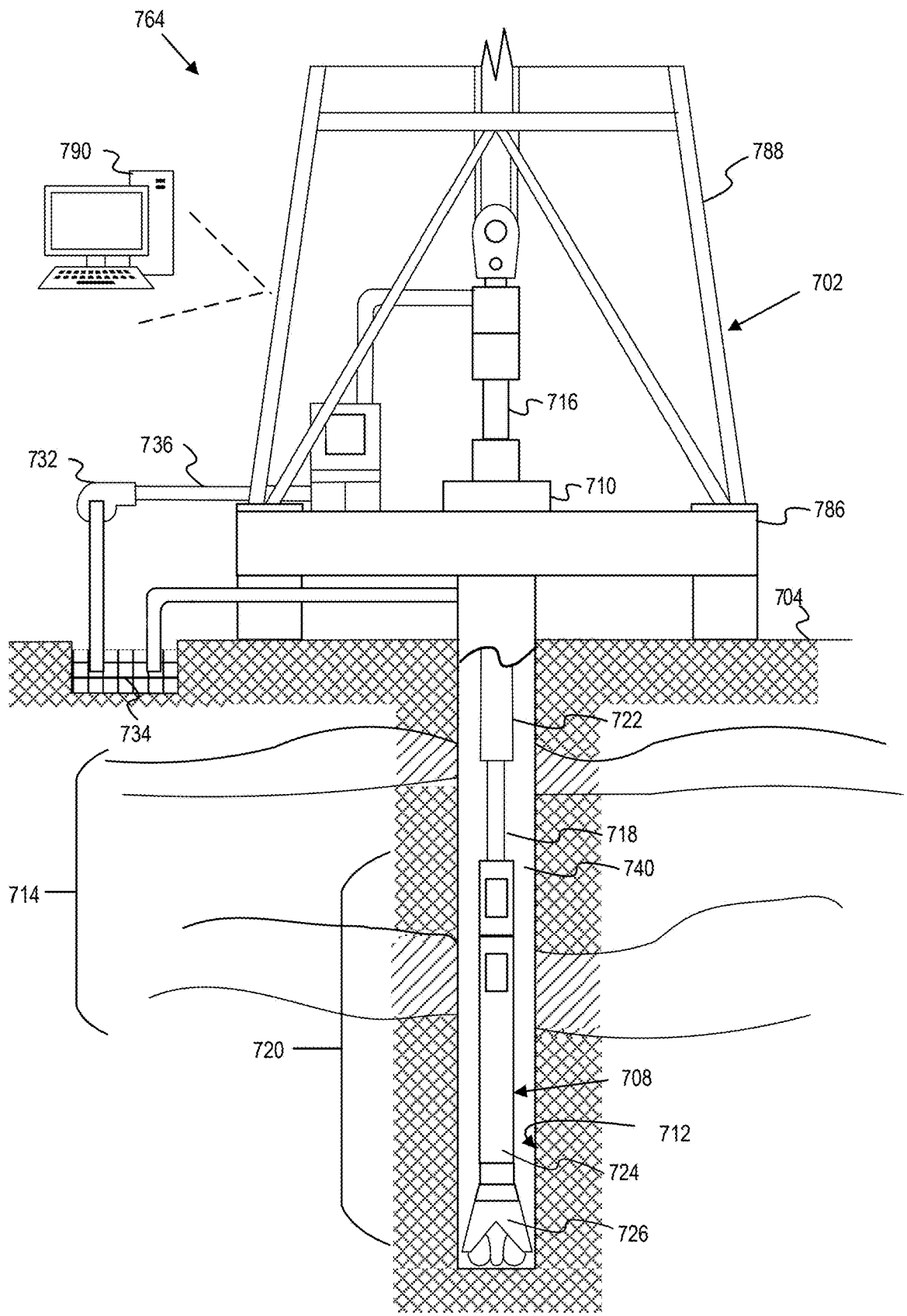
FIG. 7 is a schematic diagram of a drilling rig system as an example of oil services systems that use surface and downhole equipment, according to some implementations.

FIG. 7 is a schematic diagram of a drilling rig system as an example of oil services systems that use surface and downhole equipment, according to some implementations. For example, in FIG. 7 it can be seen how a system 764 may also form a portion of a drilling rig 702 located at the surface 704 of a well. Drilling of oil and gas wells is commonly carried out using a string of drill pipes connected together so as to form a drilling string 708 that may be lowered through a rotary table 710 into a wellbore or borehole 712. Here a drilling platform 786 may be equipped with a derrick 788 that supports a hoist. A computer system 790 may be communicatively coupled to any sensors and control devices attached to surface equipment or to the downhole equipment (e.g., downhole well devices and downhole well tools) of the system 764. One or more of the downhole well devices or well tools may include one or more downhole resistive membrane potentiometer (such as the downhole resistive membrane potentiometer 100 described in FIGS. 1-6).

The drilling rig 702 may provide support for the drill string 708. The drill string 708 may operate to penetrate the rotary table 710 for drilling the borehole 712 through subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, a down hole tool 724, and a drill bit 726. The drill bit 726 may operate to create a borehole 712 by penetrating the surface 704 and subsurface formations 714. The down hole tool 724 may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 710. In addition to, or alternatively, the bottom hole assembly 720 may also be rotated by a motor (e.g., a mud motor) that may be located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

Drilling operations may utilize various surface equipment, such as a mud pump 732 or other types of surface equipment. The surface equipment may be outfitted with one or more sensors and one or more control devices, as described herein. During drilling operations, the mud pump 732 may pump drilling fluid (sometimes known by those of ordinary skill in the art as "drilling mud") from a mud pit 734 through a hose 736 into the drill pipe 718 and down to the drill bit 726. In some implementations, one or more sensors may monitor one or more metrics of the pump drilling fluid (such as flow rate), and one or more control devices may control one or more operations of the mud pump 732 (such as opening and closing one or more valves or other mechanisms). The drilling fluid may flow out from the drill bit 726 and be returned to the surface 704 through an annular area 740 between the drill pipe 718 and the sides of the borehole 712. The drilling fluid may then be returned to the mud pit 734, where such fluid may be filtered. In some embodiments, the drilling fluid may be used to cool the drill bit 726, as well as to provide lubrication for the drill bit 726 during drilling operations. Additionally, the drilling fluid may be used to remove subsurface formation 714 cuttings created by operating the drill bit 726. It may be the images of these cuttings that many implementations operate to acquire and process.

Figure 8:
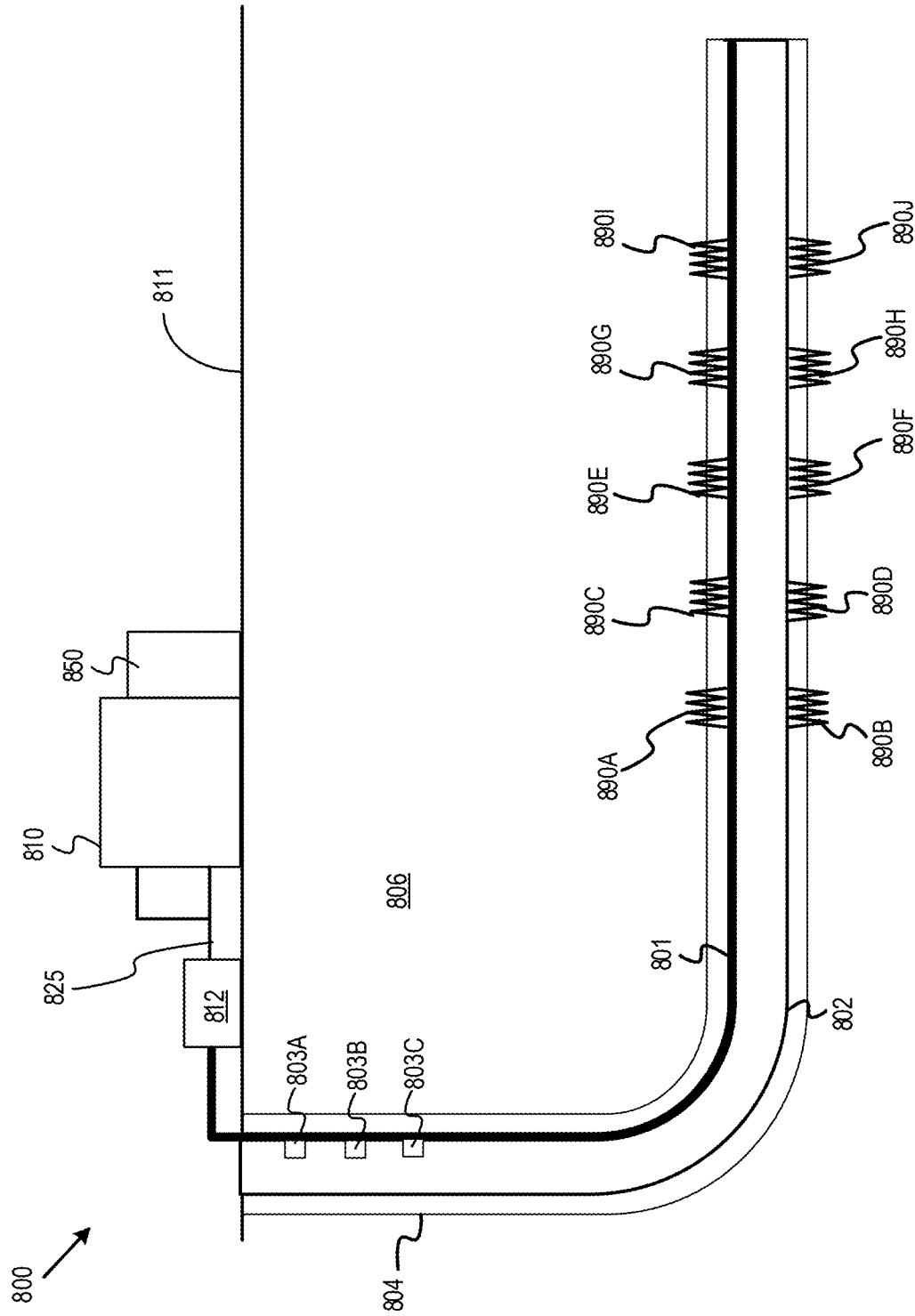
FIG. 8 is a schematic diagram of an example well system that includes fracturing operations, according to some implementations.

FIG. 8 is a schematic diagram of an example well system 800 that includes fracturing operations, according to some implementations. A well system 800 may comprise a wellbore 804 in a subsurface formation 806. The wellbore 804 may include a casing 802 and a number of perforations 890A-890J being made in the casing 802 at different depths as part of hydraulic fracturing to allow hydraulic communication between the subsurface formation 806 and the casing 802 and to allow fracturing at different zones. The well system 800 may also include one or more downhole well devices or tools. One or more of the well devices or tools may include one or more downhole resistive membrane potentiometer (such as the downhole resistive membrane potentiometer 100 described in FIGS. 1-6).

In some implementations, the well system 800 also may include a fiber optic cable 801. The fiber optic cable 801 may be cemented in place in the annular space between the casing 802 of the wellbore 804 and the subsurface formation 806. In some implementations, the fiber optic cable 801 may be clamped to the outside of the casing 802 during deployment and protected by centralizers and cross coupling clamps. The fiber optic cable 801 may house one or more optical fibers, and the optical fibers may be single mode fibers, multi-mode fibers, or a combination of single mode and multi-mode optical fibers.

In some implementations, the fiber optic cable 801 may be used for distributed sensing where acoustic, strain, and temperature data may be collected. The data may be collected at various positions distributed along the fiber optic cable 801. For example, data may be collected every 1-3 ft along the full length of the fiber optic cable 801. The fiber optic cable 801 may be included with coiled tubing, wireline, loose fiber using coiled tubing, or gravity deployed fiber coils that unwind the fiber as the coils are moved in the wellbore 804. The fiber optic cable 801 also may be deployed with pumped down coils and/or self-propelled containers. Additional deployment options for the fiber optic cable 801 may include coil tubing and wireline deployed coils where the fiber optic cable 801 is anchored at the toe of the wellbore 804. In such embodiments, the fiber optic cable 801 may be deployed when the wireline or coiled tubing is removed from the wellbore 804. The distribution of sensors (such as sensors 803A-C) shown in FIG. 8 is for example purposes only. Any suitable sensor deployment may be used. For example, the well system 800 may include fiber optic cable deployed sensors or sensors cemented into the casing. Different types of sensors deployments also may be combined in a single well, such as including both sensors cemented to the casing and sensors in plugs, flow metering devices, etc. in a single well system.

In some implementations, a fiber optic interrogation unit 812 may be located on the surface 811 of the well system 800. The fiber optic interrogation unit 812 may be directly coupled to the fiber optic cable 801. Alternatively, the fiber optic interrogation unit 812 may be coupled to a fiber stretcher module, wherein the fiber stretcher module is coupled to the fiber optic cable 801. The fiber optic interrogation unit 812 may receive measurement values taken and/or transmitted along the length of the fiber optic cable 801 such as acoustic, temperature, strain, etc. The fiber optic interrogation unit 812 may be electrically connected to a digitizer to convert optically transmitted measurements into digitized measurements. The well system 800 may contain multiple sensors, such as sensors 803A-C. There may be any suitable number of sensors placed at any suitable location in the wellbore 804. The sensors 803A-C may include pressure sensors, distributed fiber optic sensors, point temperature sensors, point acoustic sensors, interferometric sensors or point strain sensors. Distributed fiber optic sensors may be capable of measuring distributed acoustic data, distributed temperature data, and distributed strain data. Any of the sensors 803A-C may be communicatively coupled (not shown) to other components of the well system 800 (e.g., the computer 810). In some implementations, the sensors 803A-C may be cemented to a casing 802.

In some implementations, a computer 810 may receive the electrically transmitted measurements from the fiber optic interrogation unit 812 using a connector 825. The computer 810 may include a signal processor to perform various signal processing operations on signals captured by the fiber optic interrogation unit 812 and/or other components of the well system 800. The computer 810 may have one or more processors and a memory device to analyze the measurements and graphically represent analysis results on the display device 850.

In some implementations, the fiber optic interrogation unit 812 may operate using various sensing principles including but not limited to amplitude-based sensing systems like Distributed Temperature Sensing (DTS), DAS, Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and, in particular, coherent Rayleigh scattering. A DSS system may be a strain sensing system using dynamic strain measurements based on interferometric sensors (e.g., sensors 803A-C) or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

In some implementations, the fiber optic interrogation unit 812 may measure changes in optical fiber properties between two points in the optical fiber at any given point, and these two measurement points move along the optical sensing fiber as light travels along the optical fiber. Changes in optical properties may be induced by strain, vibration, acoustic signals and/or temperature as a result of the fluid flow. Phase and intensity based interferometric sensing systems may be sensitive to temperature and mechanical, as well as acoustically induced, vibrations. The fiber optic interrogation unit 812 may capture DAS data in the time domain. One or more components of the well system 800 may convert the DAS data from the time domain to frequency domain data using Fast Fourier Transforms (FFT) and other transforms. For example, wavelet transforms may also be used to generate different representations of the DAS data. Various frequency ranges may be used for different purposes and where low frequency signal changes may be attributed to formation strain changes or fluid movement and other frequency ranges may be indicative of fluid or gas movement. Various filtering techniques may be applied to generate indicators of events related to measuring the flow of fluid.

In some implementations, DAS measurements along the wellbore 804 may be used as an indication of fluid flow through the casing 802 in the wellbore 804. Vibrations and/or acoustic profiles may be recorded and stacked over time, where a simple approach could correlate total energy or recorded signal strength with known flow rates. For example, the fiber optic interrogation unit 812 may measure energy and/or amplitude in multiple frequency bands where changes in select frequency bands may be associated with oil, water and/or gas thus enabling multiphase production profiling along the wellbore 804.

Although some example well systems are shown in FIGS. 7-8, it is noted, however, that the downhole resistive membrane potentiometer described in FIGS. 1-6 can be used in any type of well system in the oil and gas industry. For example, the well systems may be any time of drilling well systems, completion well systems, and producing well systems.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for implementing a downhole resistive membrane potentiometer as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example Embodiments can include the following:

Embodiment #1: A downhole membrane potentiometer for a well system, comprising: a first circuit film having a resistance trace; a second circuit film having a collector trace; and an insulator spacer coupled between the first circuit film and the second circuit film, the insulator spacer having one or more pressure vent holes for downhole pressure regulation.

Embodiment #2: The downhole membrane potentiometer of Embodiment #1, wherein the insulator spacer includes one or more pressure vent holes in a first side of the insulator spacer and one or more pressure vent holes in a second side of the insulator spacer to minimize a differential pressure between an inside and an outside of the downhole membrane potentiometer.

Embodiment #3: The downhole membrane potentiometer of Embodiment #1, wherein insulator spacer includes a gap between a first side and a second side of the insulator spacer, the gap of the insulator spacer forming an internal cavity between the first circuit film and the second circuit film, wherein the insulator spacer includes a plurality of pressure vent holes to minimize a differential pressure between the internal cavity and an outside of the downhole membrane potentiometer.

Embodiment #4: The downhole membrane potentiometer of Embodiment #3, wherein the internal cavity is filled with a non-conductive liquid that can exit the internal cavity or enter the internal cavity via the plurality of pressure vent holes during operation of the well system to minimize the differential pressure.

Embodiment #5: The downhole membrane potentiometer of Embodiment #4, wherein the non-conductive liquid is hydraulic oil or silicone oil.

Embodiment #6: The downhole membrane potentiometer of Embodiment #1, wherein: the second circuit film having the collector trace is configured to flex to make contact with the first circuit film having the resistance trace when a contact pressure component of a downhole well device presses down on the second circuit film, the collector trace of the second circuit film making contact with the resistance trace of the first circuit film creating a closed circuit used for deriving angular or linear position measurements associated with a functional component of the downhole well device.

Embodiment #7: The downhole membrane potentiometer of Embodiments #6, wherein the contact pressure component is a round tip component, a ball plunger, or a set screw.

Embodiment #8: The downhole membrane potentiometer of Embodiments #1, wherein the first circuit film having the resistance trace and the second circuit film having the collector trace are printed using integrated circuit (IC) fabrication techniques.

Embodiment #9: The downhole membrane potentiometer of Embodiments #1, wherein the downhole membrane potentiometer is configured to withstand high temperatures and high pressures in a downhole environment.

Embodiment #10: A downhole well device for a well system, comprising: a downhole membrane potentiometer including: a first circuit film having a resistance trace; a second circuit film having a collector trace; and an insulator spacer coupled between the first circuit film and the second circuit film, the insulator spacer having one or more pressure vent holes to regulate a pressure within the downhole membrane potentiometer.

Embodiment #11: The downhole well device of Embodiments #10, wherein the insulator spacer includes one or more pressure vent holes in a first side of the insulator spacer and one or more pressure vent holes in a second side of the insulator spacer to minimize a differential pressure between an inside and an outside of the downhole membrane potentiometer.

Embodiment #12: The downhole well device of Embodiments #10, wherein insulator spacer includes a gap between a first side and a second side of the insulator spacer, the gap of the insulator spacer forming an internal cavity between the first circuit film and the second circuit film, wherein the insulator spacer includes a plurality of pressure vent holes to minimize a differential pressure between the internal cavity and an outside of the downhole membrane potentiometer.

Embodiment #13: The downhole well device of Embodiments #12, wherein the internal cavity is filled with a non-conductive liquid that can exit the internal cavity or enter the internal cavity via the plurality of pressure vent holes during operation of the well system to minimize the differential pressure.

Embodiment #14: The downhole well device of Embodiments #10, further comprising: a functional component configured to perform a function for the downhole well device; and a contact pressure component coupled with the functional component and configured to press down on the second circuit film at different positions in the resistance trace of the second circuit film depending on a movement of the functional component of the downhole device.

Embodiment #15: The downhole well device of Embodiments #14, wherein, when the contact pressure component presses down on the second circuit film, the second circuit film having the collector trace is configured to flex to make contact with the first circuit film having the resistance trace, the collector trace of the second circuit film making contact with the resistance trace of the first circuit film creating a closed circuit used for deriving angular or linear position measurements associated with the functional component of the downhole well device.

Embodiment #16: The downhole well device of Embodiments #10, wherein the well device includes a plurality of downhole membrane potentiometer and a corresponding plurality of contact pressure components.

Embodiment #17: A method for using a downhole membrane potentiometer in a well system, the method comprising: installing a downhole membrane potentiometer on a downhole well device, the downhole membrane potentiometer including a first circuit film having a resistance trace, a second circuit film having a collector trace, and an insulator spacer coupled between the first circuit film and the second circuit film, the insulator spacer having one or more pressure vent holes for downhole pressure regulation; and installing a contact pressure component on the downhole well device, the contact pressure component installed on a functional component of the downhole well device that changes positions to perform a function for the downhole well device.

Embodiment #18: The method of Embodiments #17, further comprising: changing a position of the functional component of the downhole well device from a first position to a second position when performing the function for the downhole well tool, the change in position causing the contact pressure component to press down on the second circuit film, the pressing down on the second circuit film causing the collector trace of the second circuit film to make contact with the resistance trace of the first circuit film creating a closed circuit; and deriving angular or linear position measurements associated with the change in position of the functional component of the downhole well device based on voltage measurements obtained from the closed circuit.

Embodiment #19: The method of Embodiments #17, further comprising utilizing the downhole membrane potentiometer as an angular or liner position sensor to detect a change in position associated with the functional component of the downhole well tool.

Embodiment #20: The method of Embodiments #17, wherein insulator spacer includes a gap between a first side and a second side of the insulator spacer, the gap of the insulator spacer forming an internal cavity between the first circuit film and the second circuit film, wherein the insulator spacer includes a plurality of pressure vent holes to minimize a differential pressure between the internal cavity and an outside of the downhole membrane potentiometer.

What is claimed is:

1. A downhole membrane potentiometer for a well system, comprising:
    a first circuit film having a resistance trace;
    a second circuit film having a collector trace; and
    an insulator spacer coupled between the first circuit film and the second circuit film, the insulator spacer having a plurality of pressure vent holes in one or more sides of the insulator spacer to minimize a differential pressure between an inside and an outside of the downhole membrane potentiometer.

2. The downhole membrane potentiometer of claim 1, wherein the plurality of pressure vent holes in one or more sides of the insulator spacer includes one or more pressure vent holes in a first side of the insulator spacer and one or more pressure vent holes in a second side of the insulator spacer to minimize the differential pressure between the inside and the outside of the downhole membrane potentiometer.

3. The downhole membrane potentiometer of claim 1, wherein the insulator spacer includes a gap between a first side and a second side of the insulator spacer, the gap of the insulator spacer forming an internal cavity between the first circuit film and the second circuit film, wherein the insulator spacer includes the plurality of pressure vent holes to minimize the differential pressure between the internal cavity and the outside of the downhole membrane potentiometer.

4. The downhole membrane potentiometer of claim 3, wherein the internal cavity is filled with a non-conductive liquid that can exit the internal cavity or enter the internal cavity via the plurality of pressure vent holes during operation of the well system to minimize the differential pressure.

5. The downhole membrane potentiometer of claim 4, wherein the non-conductive liquid is hydraulic oil or silicone oil.

6. The downhole membrane potentiometer of claim 1, wherein:
    the second circuit film having the collector trace is configured to flex to make contact with the first circuit film having the resistance trace when a contact pressure component of a downhole well device presses down on the second circuit film, the collector trace of the second circuit film making contact with the resistance trace of the first circuit film creating a closed circuit used for deriving angular or linear position measurements associated with a functional component of the downhole well device.

7. The downhole membrane potentiometer of claim 6, wherein the contact pressure component is a round tip component, a ball plunger, or a set screw.

8. The downhole membrane potentiometer of claim 1, wherein the first circuit film having the resistance trace and the second circuit film having the collector trace are printed using integrated circuit (IC) fabrication techniques.

9. The downhole membrane potentiometer of claim 1, wherein the downhole membrane potentiometer is configured to withstand high temperatures and high pressures in a downhole environment.

10. A downhole well device for a well system, comprising:
    a downhole membrane potentiometer including:
        a first circuit film having a resistance trace;
        a second circuit film having a collector trace; and
        an insulator spacer coupled between the first circuit film and the second circuit film, the insulator spacer having a plurality pressure vent holes in one or more sides of the insulator spacer to minimize a differential pressure between an inside and an outside of the downhole membrane potentiometer.

11. The downhole well device of claim 10, wherein the plurality of pressure vent holes in one or more sides of the insulator spacer includes one or more pressure vent holes in a first side of the insulator spacer and one or more pressure vent holes in a second side of the insulator spacer to minimize the differential pressure between the inside and the outside of the downhole membrane potentiometer.

12. The downhole well device of claim 10, wherein the insulator spacer includes a gap between a first side and a second side of the insulator spacer, the gap of the insulator spacer forming an internal cavity between the first circuit film and the second circuit film, wherein the insulator spacer includes the plurality of pressure vent holes to minimize the differential pressure between the internal cavity and the outside of the downhole membrane potentiometer.

13. The downhole well device of claim 12, wherein the internal cavity is filled with a non-conductive liquid that can exit the internal cavity or enter the internal cavity via the plurality of pressure vent holes during operation of the well system to minimize the differential pressure.

14. The downhole well device of claim 10, further comprising:
    a functional component configured to perform a function for the downhole well device; and
    a contact pressure component coupled with the functional component and configured to press down on the second circuit film at different positions in the resistance trace of the second circuit film depending on a movement of the functional component of the downhole well device.

15. The downhole well device of claim 14, wherein, when the contact pressure component presses down on the second circuit film, the second circuit film having the collector trace is configured to flex to make contact with the first circuit film having the resistance trace, the collector trace of the second circuit film making contact with the resistance trace of the first circuit film creating a closed circuit used for deriving angular or linear position measurements associated with the functional component of the downhole well device.

16. The downhole well device of claim 10, wherein the well device includes a plurality of downhole membrane potentiometer and a corresponding plurality of contact pressure components.

* * * * *